United States Patent
De Marchi

(10) Patent No.: US 6,709,165 B2
(45) Date of Patent: Mar. 23, 2004

(54) PLUG PORTION FOR AN OPTICAL PLUG CONNECTION

(75) Inventor: Silverio De Marchi, Ascona (CH)

(73) Assignee: Diamond SA, Losone (CH)

( * ) Notice: Subject to any disclaimer, the term of this patent is extended or adjusted under 35 U.S.C. 154(b) by 0 days.

(21) Appl. No.: 10/170,201

(22) Filed: Jun. 13, 2002

(65) Prior Publication Data

US 2003/0002816 A1 Jan. 2, 2003

(30) Foreign Application Priority Data

Jun. 29, 2001 (EP) .............................. 01115880

(51) Int. Cl.[7] ................................ G02B 6/38
(52) U.S. Cl. ...................................... 385/55
(58) Field of Search .................... 385/55, 53, 54, 385/59, 70

(56) References Cited

U.S. PATENT DOCUMENTS 5,579,425 A * 11/1996 Lampert et al. ............... 385/59
5,883,995 A * 3/1999 Lu ............................... 385/60

FOREIGN PATENT DOCUMENTS

| EP | 0 729 048 A1 | 8/1996 |
| EP | 0 788 002 A1 | 8/1997 |
| EP | 0 893 716 A1 | 1/1999 |
| EP | 0 962 799 A2 | 12/1999 |
| EP | 1 004 911 A1 | 5/2000 |
| EP | 1 072 918 A2 | 1/2001 |

* cited by examiner

Primary Examiner—Tulsidas C. Patel
(74) Attorney, Agent, or Firm—Nath & Associates PLLC; Marvin C. Berkowitz

(57) ABSTRACT

An optical plug connection (1) consists of a sleeve portion (2) and a plug portion (3). The sleeve portion (2) comprises a sleeve housing (4), the insert openings (5) of which are closed by protecting flaps (6) with spring action. These are formed as a bent component made of metal and are flexibly latched at the sleeve housing. For a better handling of the locking element (21) a separate gripper part (22) can be snapped onto the plug portion (3).

12 Claims, 5 Drawing Sheets

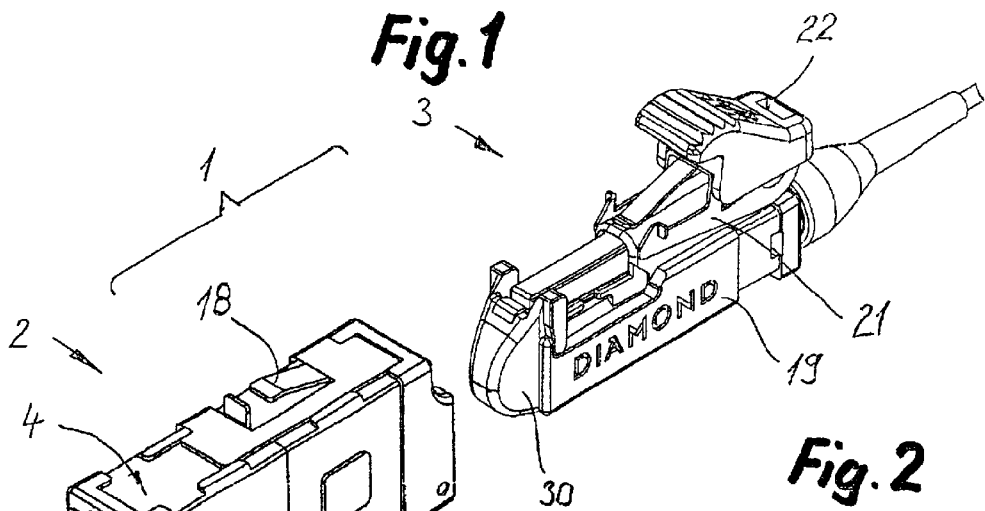
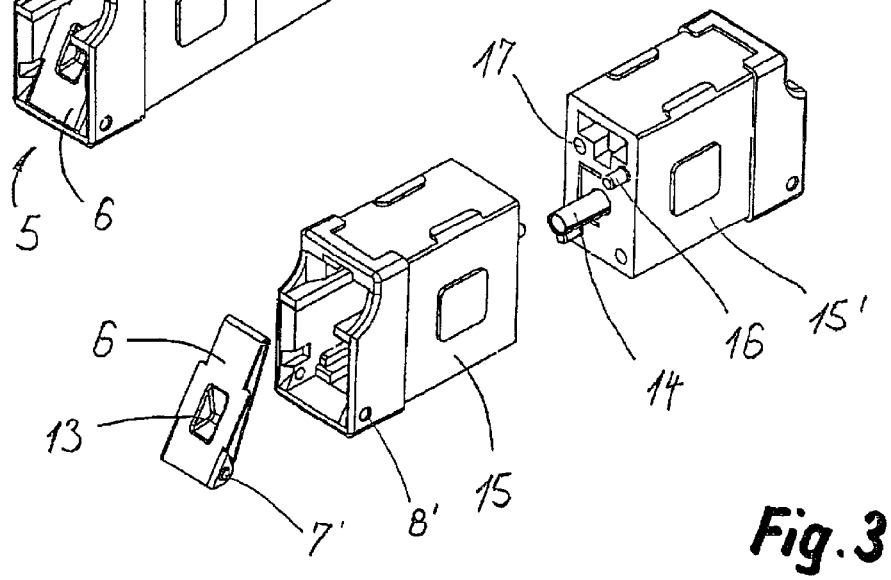
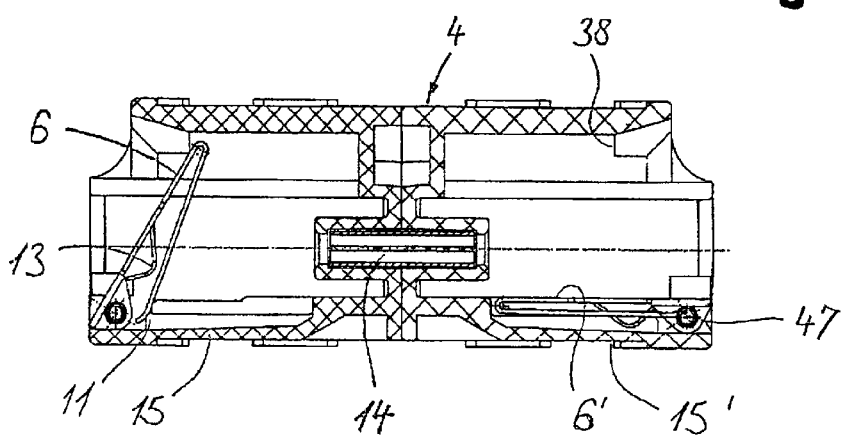

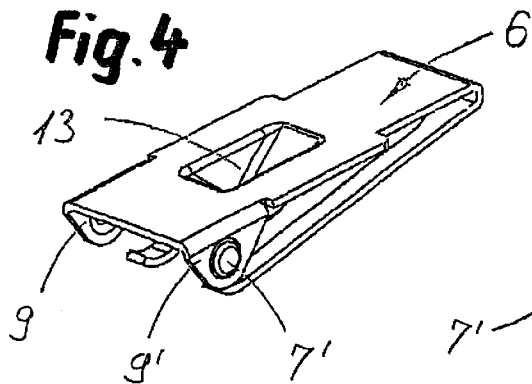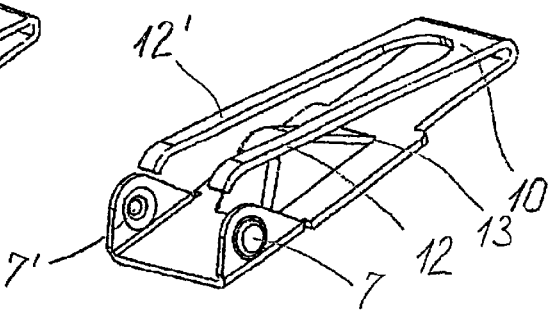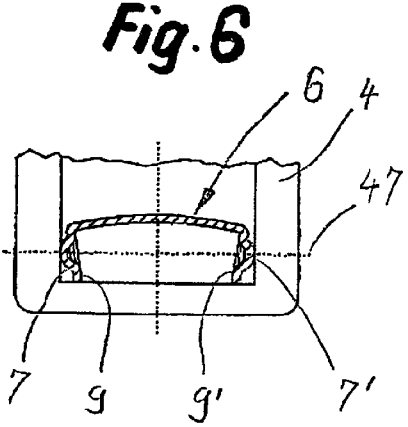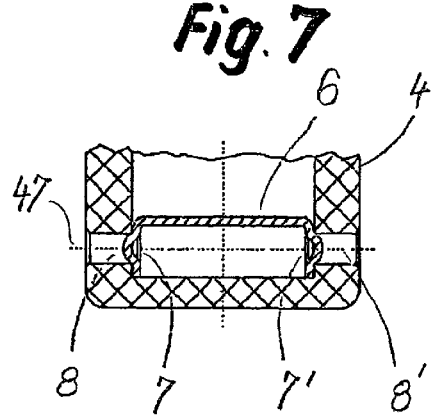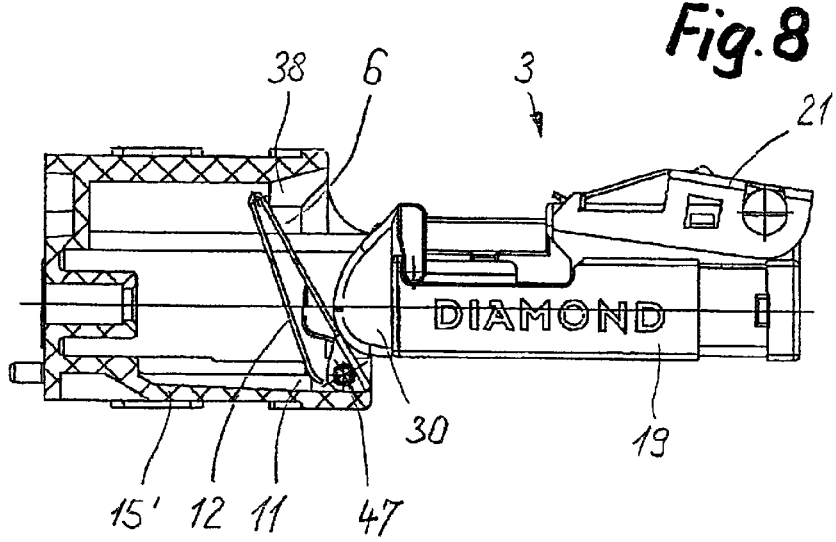

PLUG PORTION FOR AN OPTICAL PLUG CONNECTION

FIELD OF THE INVENTION

The invention relates to a plug portion for an optical plug connection according to the preamble of claim 1. Together, sleeve portions and plug portions of the type mentioned form an optical plug connection, in which light can be transmitted with as less transmission losses as possible. Therefore the sleeve portion can either centre a pair of plugs towards one another or it can align an one-side inserted plug with an optical element as e.g. a light receiver or a light transmitter.

BACKGROUND OF THE INVENTION

For optical plug connections demands are always increasing. On the one hand, similar to electronical components, a continuous miniaturisation is demanded, nevertheless a manual handling still must be guaranteed. On the other hand this miniaturisation must not make the assembling more difficult and expensive, and for reasons of production, the plug connection should comprise as less component parts as possible.

A comparable kind of a plug connection is known, for example, from the EP A 1 072 918. This meets all of today's demands, as e.g. tensile strong lock of the plug portion in the sleeve portion, the facing side of the connector pin being protected by a protecting cover, dipped insert openings and much more. However, in practise it has been shown, that the production and the assembling is still involved with a great effort and that depending on the purpose of use in particular the handling of the plug is difficult due to its small gripping surface.

For the enlargement of the gripping surface at duplex plug portions it is already known from the U.S. Pat. No. 5,579,425, to insert a clip between the both simplex plugs, which on the one hand connects the both simplex plugs with one another and which on the other hand comprises a flexible gripper part, which engages onto the both lever arms at the single plugs indirectly serving for the release. However the gripper element is not tightly connected to those lever arms, and furthermore the problem at the single plugs is not solved therewith.

SUMMARY OF THE INVENTION

Therefore it is an object of the present invention to create a plug portion of the type mentioned above, in order to produce an optical plug connection with a few components and little effort of assembling, which can be handled well in spite of the miniaturisation. This object is solved by a plug portion comprising the features of claim 1.

The gripper part, being separately snappable onto the locking element, simplifies the handling of the plug portion considerably, and the effort of assembling is less. The separate gripper part can also additionally be used for the encoding of the plug portion, for example by the use of different colours.

The locking element can be formed as a bent component made of metal and the gripper part made of plastic material. The gripper parts of different colours can be produced cheaply therewith by means of the injection moulding method.

The gripper part can engage partly onto the locking element and can be anchored at lateral snap cams behind edges of the locking element. However, also push-bottom like snap connections would be conceivable. The engagement of the locking element is especially advantageous, if it itself is snapped onto the plug housing. In a snap connection with lateral opening snap legs, the gripper part serves for the securing of the snapped-on locking element.

In this case, the locking element can for example be snapped onto the plug housing at lateral linkage cams, engaging in recesses at the locking element, the latter comprising two parallel arms, laterally extending along the plug housing, at which ends there are arranged detent pawls, which are able to engage at the undercuts of the sleeve portion.

Furthermore it is advantageous, if the locking element is provided integrally with a leaf spring, which is supported between the parallel arms, preferably in the region of the both detent pawls at the plug housing and thus preloads the detent pawls in the engaged position.

A duplex plug unit can be formed most preferably in that at least two plug portions are associated with a connector in a position almost running in parallel next to each other and that a common gripper part is able to snap onto the locking elements of the both plug portions.

An optical connection can be formed with a prescribed plug portion and with a sleeve portion, said sleeve portion comprising a sleeve housing with at least one insert opening, which is closed by means of a pivotable protective flap, which is held in closed position by means of the power of a close spring, said protective flap being a bent component made of metal, that is flexibly latched at the sleeve housing.

The formation of the protective flap as a bent component made of metal that is flexibly latched at the sleeve housing, allows to omit the use of the hitherto usual axis in order to link the protective flap. Thereby not only a component is omitted which is difficult in handling, but also the assembling is substantially facilitated.

The protective flap can thereby be linked at a pivoting bearing, comprising a pair of linkage cams and hinge sockets. Thereby, the linkage cams can be arranged at lateral wings, that are bent towards the plane of the protective flap. The hinge sockets are advantageously formed by through openings in the sleeve housing. Thus also conventional protective flaps with separate axes can be linked at the same sleeve housing respectively these conventional protective flaps at existing sleeve portions can be exchanged for those according to the present invention.

Further advantages can be achieved, if the close spring is a leaf spring formed integrally with the protective flap which is supported at the bottom of the sleeve housing. Thereby an additional coiled spring for enforcing the spring power is omitted.

If the leaf spring is divided in two separate spring tongues at least in the region of the support, the desired spring power depending on the chosen width of the tongues can be set relatively fine. The stress-free leaf spring can thereby be inclined in an angle of 10° to 20°, preferably of about 15°, towards the protective flap, said support being performed nearby the pivoting axis. Thus the leaf spring takes up a small amount of space.

The prescribed sleeve portion with the latched protective flap could also be used for plug connectors with conventional plug portions.

Particularly preferred, the sleeve portion can be used by an additional means in an optical plug connection, which allows the inclusion of different categories of plug portions, at which a connector pin is retained in the plug housing, protruding over the facing side of the plug housing. For this purpose a bulging, which is directed against the interior of the sleeve housing, is provided in the protective flap in order to prevent a collision with the connector pin when the plug portion is inserted into the sleeve portion. For plug portions, the facing side of which is not protected by a protecting cover, it is thus prevented, that the facing side of the connector pin ascents on the protective flap before it is pivoted back. Thereby it is suitable when the bulging is wider than the diameter of the connector pin, but narrower than the facing side of the plug housing. The depth of the bulging is dimensioned in such a way that the facing side of the connector pin never gets in contact to the surface of the protective flap and the latter is pushed open by the facing side of the plug housing.

The locking element itself can be made snappable onto to the plug housing, such that the entire assembling of the optical plug connector is performed by separate snap connections. Embodiments of the present invention are shown in the drawings and are described in detail as follows.

BRIEF DESCRIPTION OF THE DRAWINGS

FIG. 1 is a perspective view of an optical plug connection consisting of a sleeve portion and a plug portion, FIG. 2 is a perspective view of said sleeve portion according to FIG. 1 in the non-assembled state, FIG. 3 is a cross section through said sleeve portion according to FIG. 1 with an opened and a closed protective flap, FIG. 4 is a perspective plan view on a protective flap, FIG. 5 is a perspective plan view from the bottom side of said protective flap according to FIG. 4, FIG. 6 is a cross section through a protective flap when it is assembled in the sleeve housing, FIG. 7 shows said protective flap according to FIG. 6 in engaged position, FIG. 8 is a cross section through half of the housing of a sleeve portion when a plug portion is inserted.

DETAILED DESCRIPTION

Figure 9:
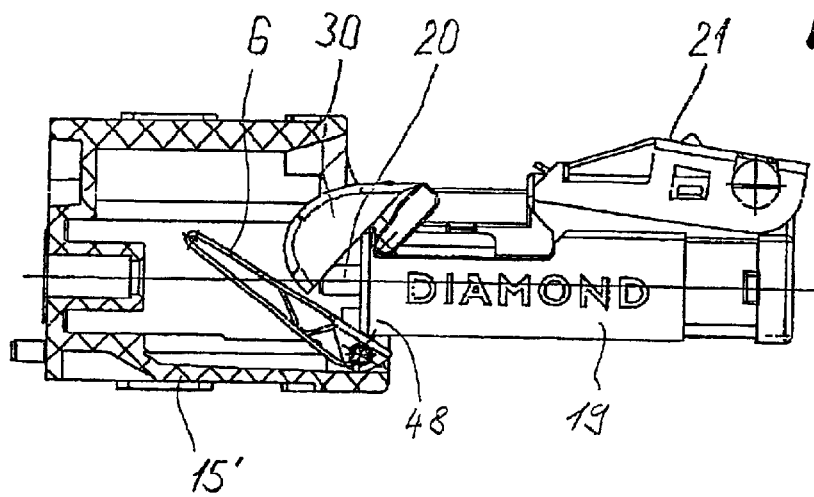
FIG. 9 shows said half of the housing according to FIG. 8 with partially opened protective flap and partially opened protecting cover at the plug portion.

As it is shown in FIG. 1, an optical plug connection, together referred to as 1, consists of at least one sleeve portion 2 and at least one plug portion 3. The shown sleeve portion is formed as a so-called middle piece, that can be fixed to a device wall e.g. by means of a fixing clip 18 being able to snap-on and that comprises an insert opening 5 on both sides, in which a plug portion of the same kind can be inserted. Each insert opening or optionally also only one of them is closed by a protective flap 6, which pivots back by the inserting power when the plug portion 3 is inserted and which releases the insert opening.

As it is shown from FIG. 2, the sleeve portion 2 consists of a sleeve housing 4, which advantageously comprises two identical housing halves 15, 15'. The housing halves are shaped hermaphroditic such that they can be put together at a bolt 16 or respectively at openings 17 and for example can be adhered. Thus said both housing halves include a centring barrel 14 floatingly mounted, in which the connector pins of the inserted plug portions become centred on one another.

Each protective flap 6, 6' is mounted to be able to pivot around a pivoting axis 47. Details of the configuration of the protective flap respectively of the linkage bearing are apparent from the FIGS. 4 and 5 respectively 6 and 7. Each protective flap is formed as a bent component made of metal, the lateral bent wings 9, 9' both being provided with one linkage cam 7, 7'. Thereby the linkage cams consist of a deformation of the material. Furthermore there is provided a leaf spring 10 at the protective flap 6, which is inclined towards the plane of the protective flap at about 15°. The leaf spring passes over into two separate spring tongues 12, 12', which still only exert a slight spring action. In about the middle of the protective flap 6 a deeply moulded bulging 13 is provided.

When inserting the protective flap in the sleeve housing, the both wings 9, 9' get a little bit pressed together in such a way that the protective flap 6 gets bent up in its longitudinal direction. This position is shown in FIG. 6. As soon as the linkage cams 7, 7' have reached the step bearings 8, 8', they engage and thereby built the linking connection. Now the protective flap 6 is able to pivot around the pivoting axis 47.

In the latched position the both spring tongues 12, 12' are supported at the bottom 11 of the sleeve housing and press the protective flap in the closed position (FIG. 3). Thereby a undercut 38 serves as a stop and is at the same time serving for the anchoring of the inserted plug portion.

Figure 12:
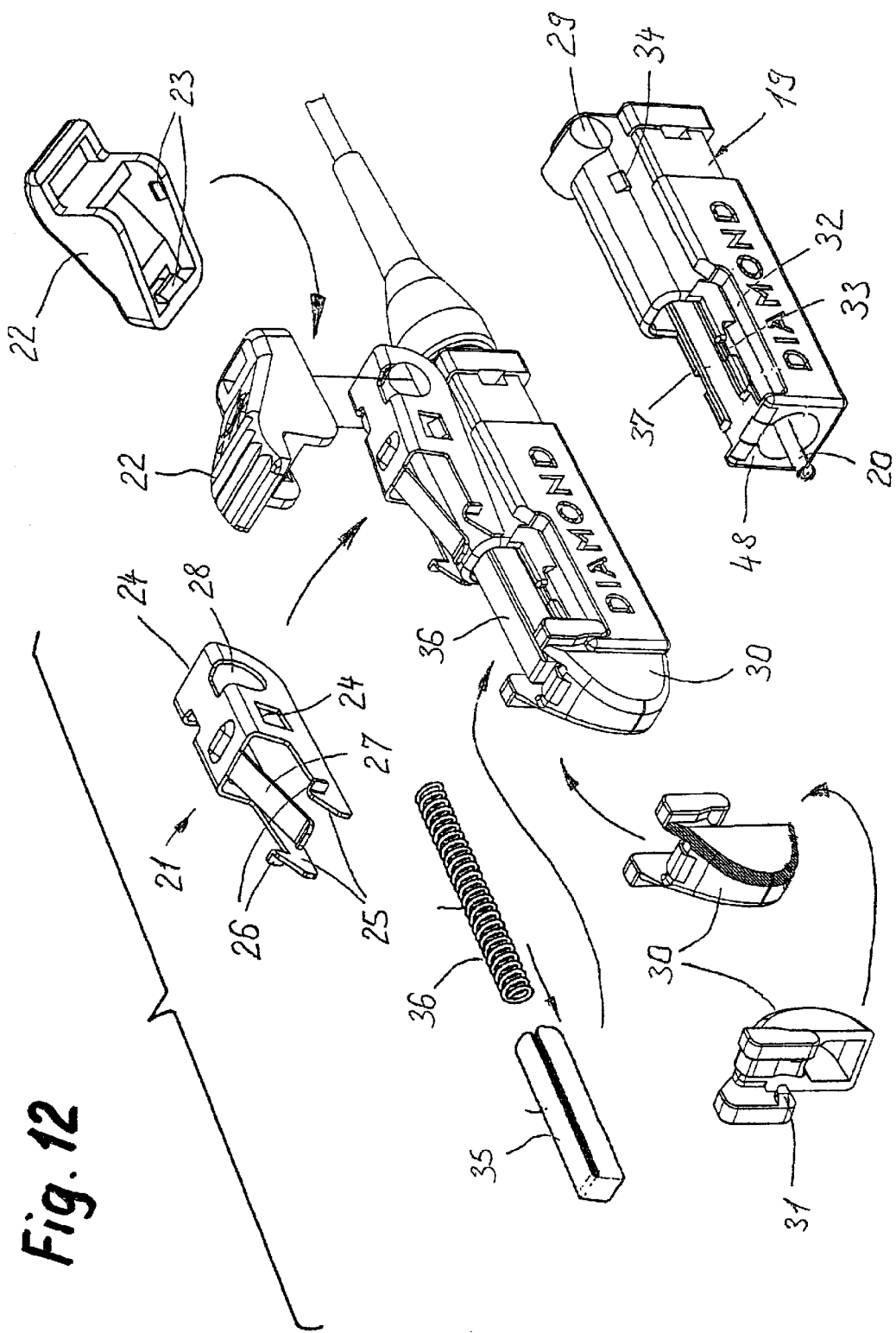
FIG. 12 is a perspective entire view of a plug portion with the view of certain components in detail.

A first category of a plug portion is shown in more detail in FIG. 12. The plug portion consists of a plug housing 19, the facing side 48 of which is covered with a protecting cover 30 being able to both pivot and slide. Said protecting cover thereby covers up the connector pin 20 slightly protruding over the facing side 48. The protecting cover contains a pair of guide cams and linkage cams 31, which are engaged in guide tracks 32 at the plug housing. The insertion is thereby performed by means of insert grooves 33. The opening of the protecting cover is performed by a mechanical control at the insertion process into the sleeve portion.

The protecting cover 30 is preloaded into the closed position by a coiled spring 36, which is held in a hollow tappet 35. This one is slideable in a tappet guide 37 on the plug housing.

On the plug housing 19 a locking element 21 is snapped-on. For this there are provided lateral linkage cams 29 engaging into recesses 28. The locking element 21 comprises two lateral parallel arms 25, at which ends there are arranged bents 26. These serve as detent pawls engaging into the undercuts 38 at the sleeve portion and thus locking the plug portion tensile strong. Thereby, the locking element 21 is preloaded with a leaf spring 27 into the locking position, which supports on the surface of the plug housing, namely approximately in the region of the both bents 26. In the withdrawn state lateral stops 34 at the plug housing limit the final position of the locking element.

For a better manual handling of the locking element 21 when a plug portion is mounted, a gripper part 22 is provided, which is snapped onto the locking element. Thereby, the gripper part is designed as ergonomic as possible and laterally overlaps the locking element such that a good stability is ensured. For the snap connection there are provided snap cams 23 on the inner side engaging behind edges 24 at the locking element 21.

The connector pin 20 is mounted with axial spring action inside the plug portion. Details of this can for example be taken from the EP A 1 072 918 mentioned above.

Figure 10:
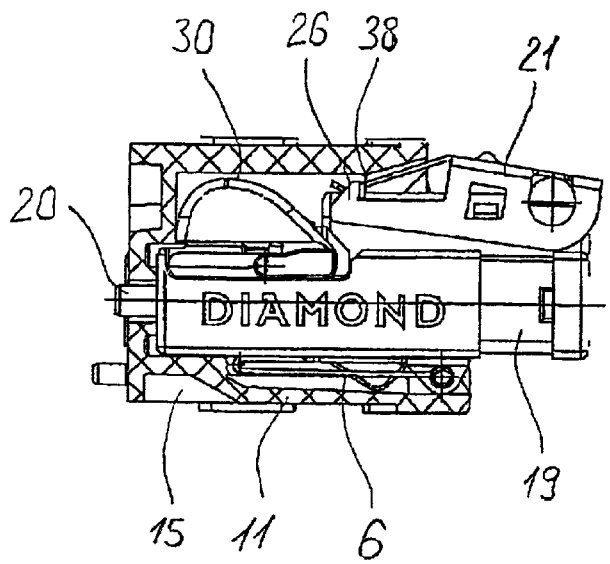
FIG. 10 shows said half of the housing according to FIG. 8 with totally inserted and anchored plug portion.

In the FIGS. 8 to 10 there are shown the movement processes being performed when a plug portion 3 is inserted into a sleeve portion 2. From FIG. 8 it is apparent that the first contact of the plug portion with the protective flap 6 takes place at the outer side of the protecting cover 30. Therefore, over the first some angular degrees, the protective flap 6 is pivoted back by the protecting cover 30, which at the same time begins to open. FIG. 9 shows a position, in which the protecting cover 30 is partially opened and the further pivoting back of the protective flap 6 is performed at the facing side 48 of the plug housing 19. In this inclined position of the protective flap 6 the facing side of the connector pin 20 is already spaced apart from the plane of the protective flap in a certain distance.

At the position shown in FIG. 10, the final position of the plug portion is reached, in which the bents 26 engage at the undercuts 38. The protecting cover 30 is pivoted open by 90° and is retracted relatively to the facing side 48 of the plug housing 19. The connector pin 20 now penetrates inside the centring barrel 14 (FIG. 3). The protective flap 6 is now totally pivoted back and runs approximately in parallel to the bottom 11 of the sleeve housing.

Figure 11:
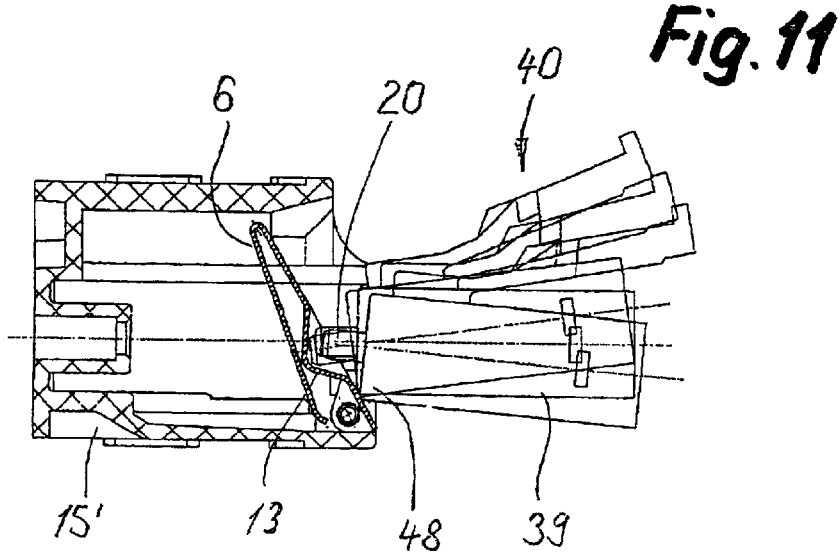
FIG. 11 is a cross sectional view through said half of the housing according to FIG. 8 when a second category of plug portions without a protecting cover at the facing side is inserted.

In FIG. 11 the insertion process for a second category of a plug portion 40 is indicated, which plug housing 39 is not covered with a protecting cover at the facing side. Therefore the connector pin 20 protrudes unprotected over the facing side and would collide with the protective flap 6 at the beginning of the insertion process. However this is prevented by the bulging 13, such that from the beginning the protective flap 6 is only in contact with the facing side 48 of the plug housing 39, which is wider than the bulging 13.

Figure 13:
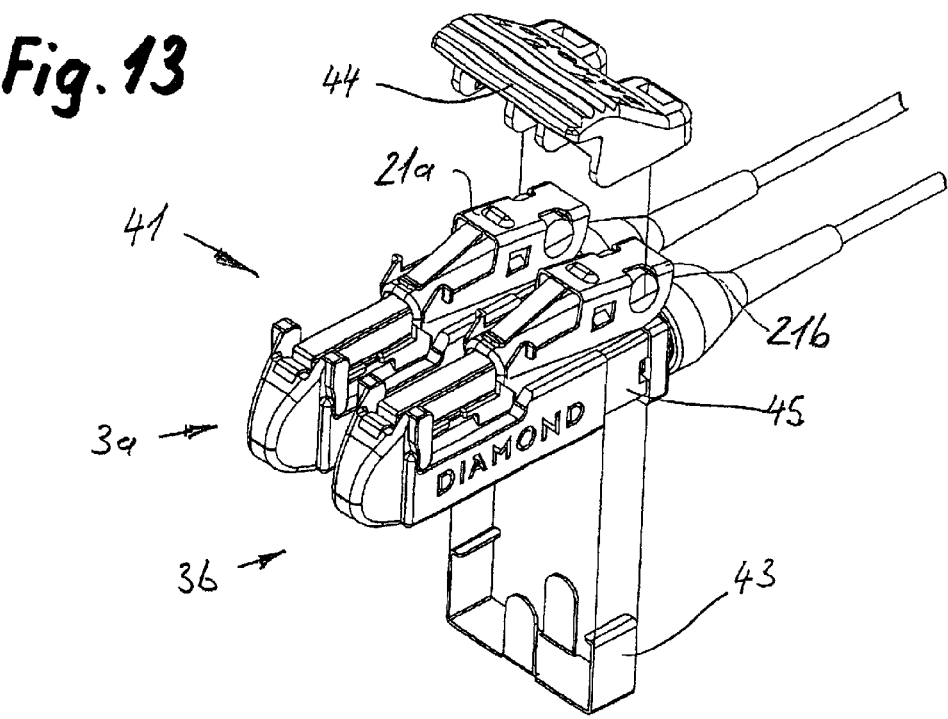
FIG. 13 is a perspective view of a duplex plug before assembling.
Figure 14:
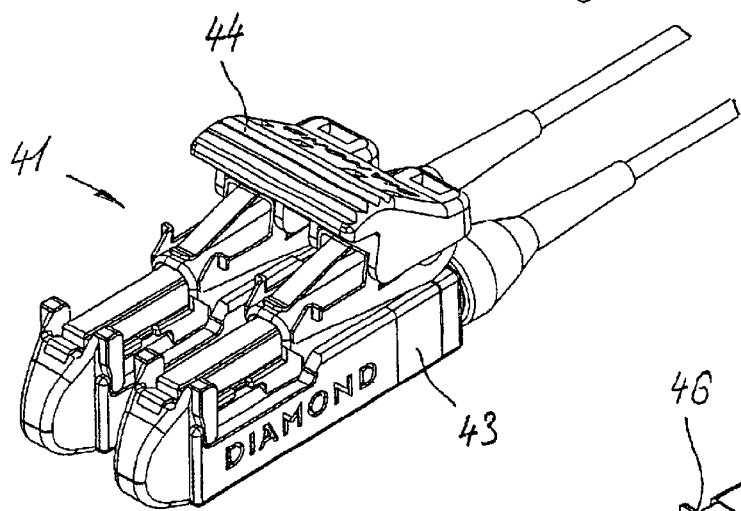
FIG. 14 shows said assembled duplex plug according to FIG. 13.
Figure 15:
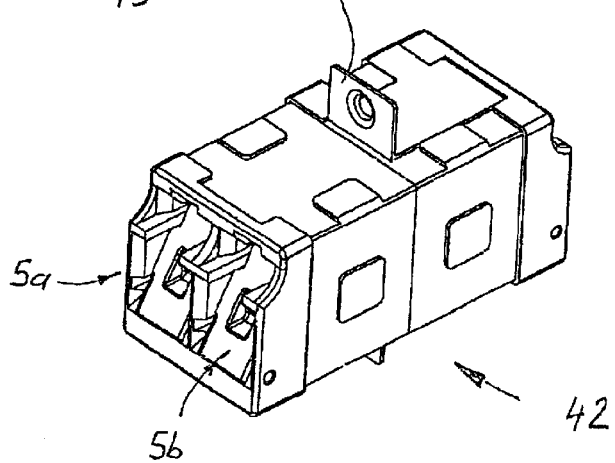
FIG. 15 is a perspective view of a duplex sleeve portion.

Finally the FIGS. 13 to 15 further show the possibility of an optical duplex plug connector. For this purpose, two plug portions 3a and 3b, as described above, are connected with the aid of a connection clip 43 to a duplex plug portion 41. Thereby, the connection clip can be laterally latched at a collar 45. The plug portions 3a and 3b are held on distance in parallel towards each other, but they can still move slightly in different axes of space. Over the both locking elements 21a and 21b a common double gripper part 44 is now snapped-on, such that in the end a common handling respectively release of the both plug portions is possible (FIG. 14).

For such a duplex plug portion a special duplex sleeve portion 42 is provided, which is however arranged similar to the sleeve portion according to FIG. 2. As an alternative fixing form at a housing wall, a screwable fixing clip 46 is shown here.

What is claimed is:

1. A plug part for an optical plug and socket connection, said plug part comprising:
   a plug housing in which at least one plug pin is held and at least one resilient locking element for pull proof locking of the plug part in a socket part on reaching a final insert position,
   wherein the locking element is pivotably fastened on a rotational link and is snapped on said plug housing and the locking element is a one piece part formed as a bent component of metal comprising two parallel arms extending on each side of the plug housing, said arms having ends on which there are arranged respective detent pawls, and a leaf spring which is arranged between said parallel arms and on which the locking element is resiliently supported on the plug housing, and
   further comprising a gripper part made of plastic material which is snapped onto the locking element and which laterally overlaps the locking element.

2. The plug part according to claim 1, wherein the locking element is snapped onto lateral linkage cams at the plug housing, which engage in recesses at the locking element.

3. The plug part according to claim 1, wherein the gripper part is anchored at lateral snap cams behind edges of the locking element.

4. The plug part according to claim 1, wherein at least two plug parts with a connector are associated in a position almost running in parallel next to each other and that a common gripper part is snapped onto the locking elements of both plug parts.

5. An optical plug and socket connection having one plug part according to claim 1 and a socket part comprising a socket housing with at least one insert opening which is closed by a pivotable protective flap held in closed position by means of spring, wherein said protective flap is a bent component made of metal flexibly latched at the socket-housing.

6. The optical plug and socket connection according to claim 5, wherein the protective flap is linked at a pivoting bearing, that comprises a pair of linkage cams and hinge sockets.

7. The optical plug and socket connection according to claim 6, wherein the linkage cams are arranged at lateral wings bent towards a plane of the protective flap and that the hinge sockets are formed by openings in the socket housing.

8. The optical plug and socket connection according to claim 5, wherein the spring is a leaf spring integrally formed with the protective flap, which is supported at a bottom of the socket housing.

9. The optical plug and socket connection according to claim 8, wherein at least in a region of support the leaf spring is divided in two separate spring tongues.

10. The optical plug and socket connection according to claim 8, wherein a stress-free leaf spring is inclined at an angle of 10° to 20° towards the protective flap and that the support is performed near to a pivoting axis of a pivoting bearing.

11. The optical plug and socket connection according to claim 5, wherein the plug part comprises a plug housing, in which at least one connector pin is held which is protruding over a facing side of the plug housing, and wherein inside the protective flap a bulging being directed against an interior of the socket housing is provided to prevent a collision with the connector pin when the plug part is inserted into the socket cart.

12. The optical plug and socket connection according to claim 11, wherein the bulging is wider than a diameter of the connector pin, but narrower than the facing side of the plug housing.

* * * * *